(12) United States Patent
Dix et al.

(10) Patent No.: US 6,887,043 B2
(45) Date of Patent: May 3, 2005

(54) METHODS AND APPARATUS FOR ASSEMBLING GAS TURBINE ENGINES

(75) Inventors: Brian Edward Dix, Ipswich, MA (US); Joann Mari Takehara, Reading, MA (US); Michael Ray Garrison, Fishersville, VA (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 10/402,566

(22) Filed: Mar. 28, 2003

(65) Prior Publication Data

US 2004/0258522 A1 Dec. 23, 2004

(51) Int. Cl.[7] .............................................. B64C 11/14
(52) U.S. Cl. .................. 416/94; 416/245 R; 416/244 A
(58) Field of Search .............................. 416/94, 244 R, 416/245 R, 244 A; 29/889.21

(56) References Cited

U.S. PATENT DOCUMENTS

| | | | |
|---|---|---|---|
| 3,446,429 A | * | 5/1969 | Suzuki et al. ............ 416/220 R |
| 5,182,906 A | | 2/1993 | Gilchrist et al. |
| 5,211,541 A | | 5/1993 | Fledderjohn et al. |
| 5,224,807 A | | 7/1993 | Belser |
| 5,281,096 A | | 1/1994 | Harris et al. |
| RE35,358 E | | 10/1996 | Belser |
| 5,820,347 A | * | 10/1998 | Bussonnet et al. .......... 416/221 |
| 6,217,283 B1 | * | 4/2001 | Ravenhall et al. ............. 416/2 |
| 6,293,595 B1 | | 9/2001 | Marc et al. |
| 6,358,014 B1 | | 3/2002 | Chou et al. |
| 6,364,587 B1 | | 4/2002 | Ingvarsson |
| 6,416,280 B1 | | 7/2002 | Forrester et al. |
| 6,447,250 B1 | | 9/2002 | Corrigan et al. |
| 6,457,942 B1 | | 10/2002 | Forrester |
| 6,481,971 B1 | | 11/2002 | Forrester |
| 6,520,742 B1 | | 2/2003 | Forrester et al. |

* cited by examiner

Primary Examiner—Ninh H. Nguyen
(74) Attorney, Agent, or Firm—William Scott Andes; Armstrong Teasdale LLP

(57) ABSTRACT

A method for enables a gas turbine engine to be assembled. The method comprises forming at least one substantially elliptically-shaped opening within a flange extending from a fan disk, inserting a fastener including a first body portion, a second body portion, and an anti-rotation stop extending therebetween, at least partially through the at least one flange opening, and coupling the fastener to the flange such that the fastener stop is positioned within the at least one flange opening.

19 Claims, 4 Drawing Sheets

METHODS AND APPARATUS FOR ASSEMBLING GAS TURBINE ENGINES

BACKGROUND OF THE INVENTION

This invention relates generally to gas turbine engines, more particularly to methods and apparatus for assembling gas turbine engines.

At least some known gas turbine engines include, in serial flow arrangement, a fan assembly and a high pressure compressor which compress airflow entering the engine, a combustor which burns a mixture of fuel and air, and low and high pressure rotary assemblies which each include a plurality of rotor blades that extract rotational energy from airflow exiting the combustor. The fan assembly includes a plurality of circumferentially-spaced fan blades that extend radially outwardly from an annular fan disk. A spinner is coupled to a front end of the fan assembly to facilitate providing smooth airflow into the fan assembly.

Known spinners are coupled directly to the disk by a plurality of circumferentially-spaced threaded studs. The studs are axially and radially secured to the disk prior to the spinner being coupled to the fan assembly. Additionally, securing the studs to the disk prevents the studs from rotating such that nuts used to couple the spinner to the disk can be tightened. To secure known studs to the disk, initially each stud is riveted to a wingbolt member. The wingbolt member is then riveted to the disk.

Coupling the spinner to the disk may be a time-consuming process, as the riveting and drilling processes must each be precise to prevent inadvertent damage to the disk. Specifically, each wingbolt member requires three holes to be formed in the fan disk, wherein two of the holes are countersunk and are drilled into the fan disk for each set of rivets used to couple the wingbolt members to the disk, and one of the openings is drilled into the fan disk to receive the threaded stud therethrough. As a result, the assembly process may be time-consuming and

BRIEF DESCRIPTION OF THE INVENTION

In one aspect, a method for assembling a gas turbine engine is provided. The method comprises forming at least one substantially elliptically-shaped opening within a flange extending from a fan disk, inserting a fastener including a first body portion, a second body portion, and an anti-rotation stop extending therebetween, at least partially through the at least one flange opening, and coupling the fastener to the flange such that the fastener stop is positioned within the at least one flange opening.

In another aspect, a fan assembly for a gas turbine engine is provided. The fan assembly comprises a fan disk, and an annular forward extension. The fan disk includes a plurality of hubs coupled to a disk rim by a plurality of webs. The forward extension includes a flange, and the forward extension extends forwardly from an upstream most of the webs. The flange includes a plurality of circumferentially spaced openings extending therethrough. At least one of the openings is substantially elliptically-shaped.

In a further aspect, a fan assembly is provided. The fan assembly includes a fan disk, at least one fastener, and a spinner. The at least one fastener includes a first body portion, a second body portion, and an anti-rotation stop extending therebetween. The spinner is coupled to the fan disk by the at least one fastener.

DETAILED DESCRIPTION OF THE INVENTION

Figure 1:
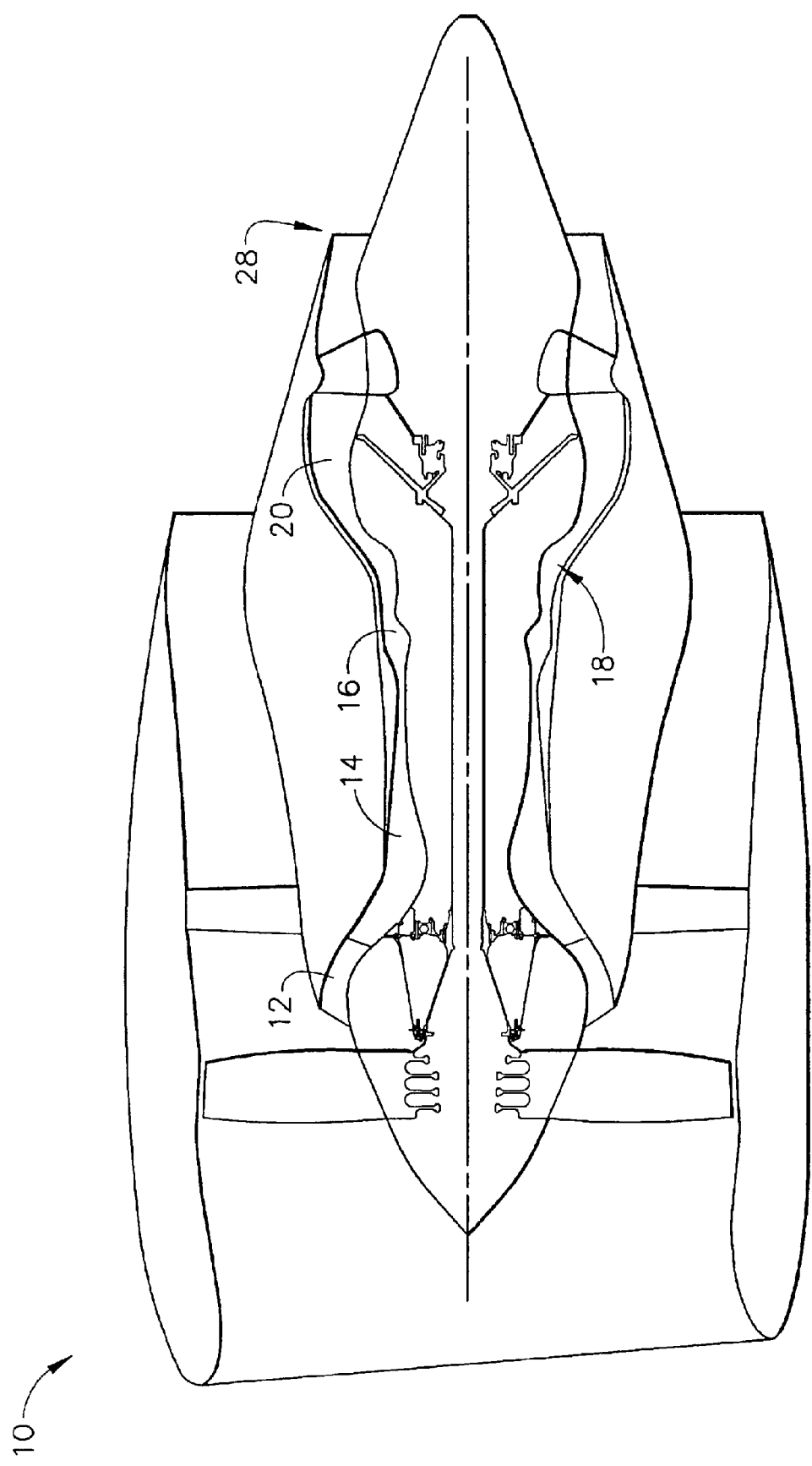
FIG. 1 is a schematic of a gas turbine engine.

FIG. 1 is a schematic illustration of a gas turbine engine 10 including a fan assembly 12, a high pressure compressor 14, and a combustor 16. In one embodiment, engine 10 is a CF34 engine available from General Electric Company, Cincinnati, Ohio. Engine 10 also includes a high pressure turbine 18 and a low pressure turbine 20. Fan assembly 12 and turbine 20 are coupled by a first shaft 24, and compressor 14 and turbine 18 are coupled by a second shaft 26.

In operation, air flows through fan assembly 12 and compressed air is supplied from fan assembly 12 to high pressure compressor 14. The highly compressed air is delivered to combustor 16. Airflow from combustor 16 drives rotating turbines 18 and 20 and exits gas turbine engine 10 through an exhaust system 28.

Figure 2:
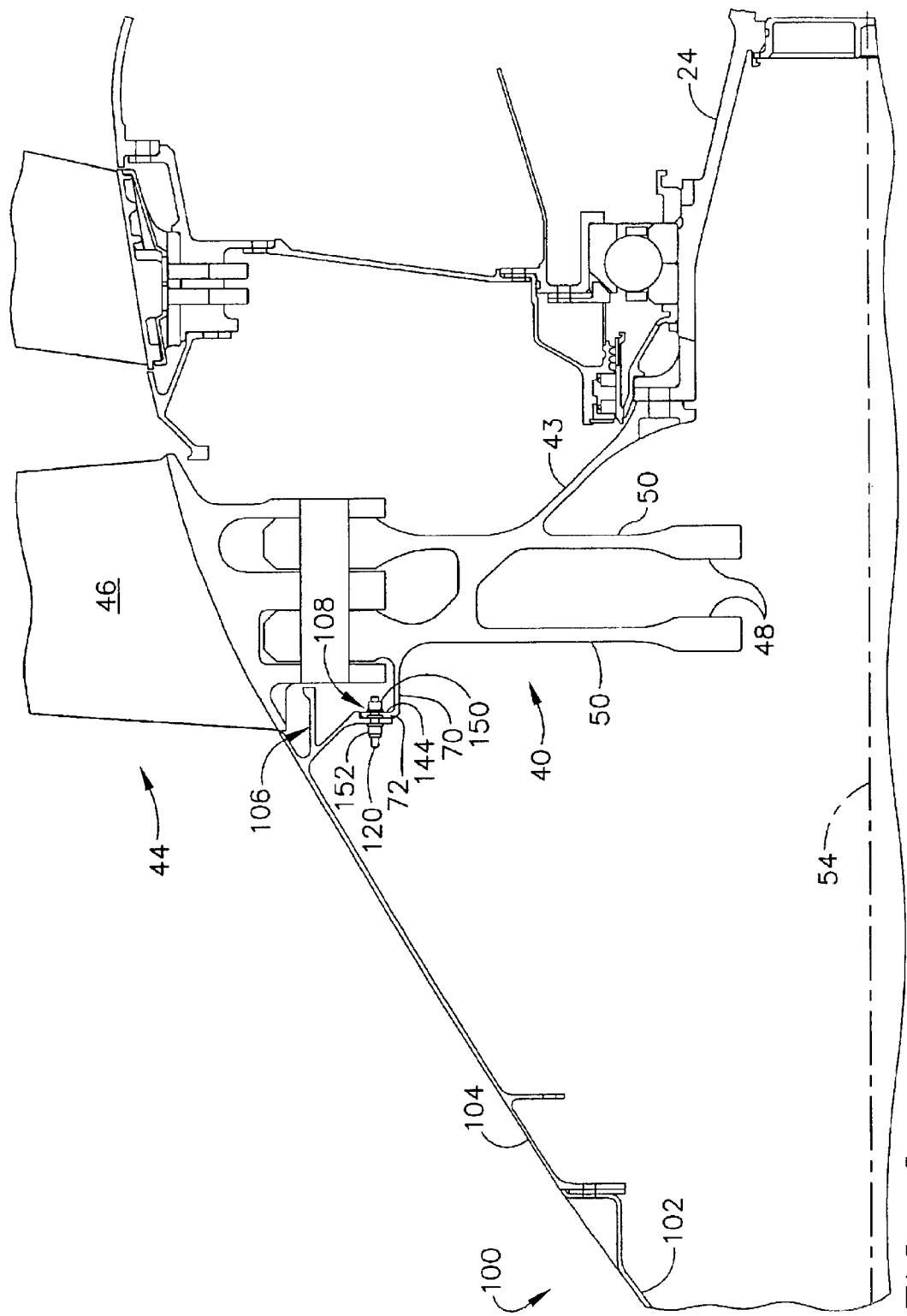
FIG. 2 is a cross-sectional illustration of a portion of the gas turbine engine shown in FIG. 1.
Figure 3:
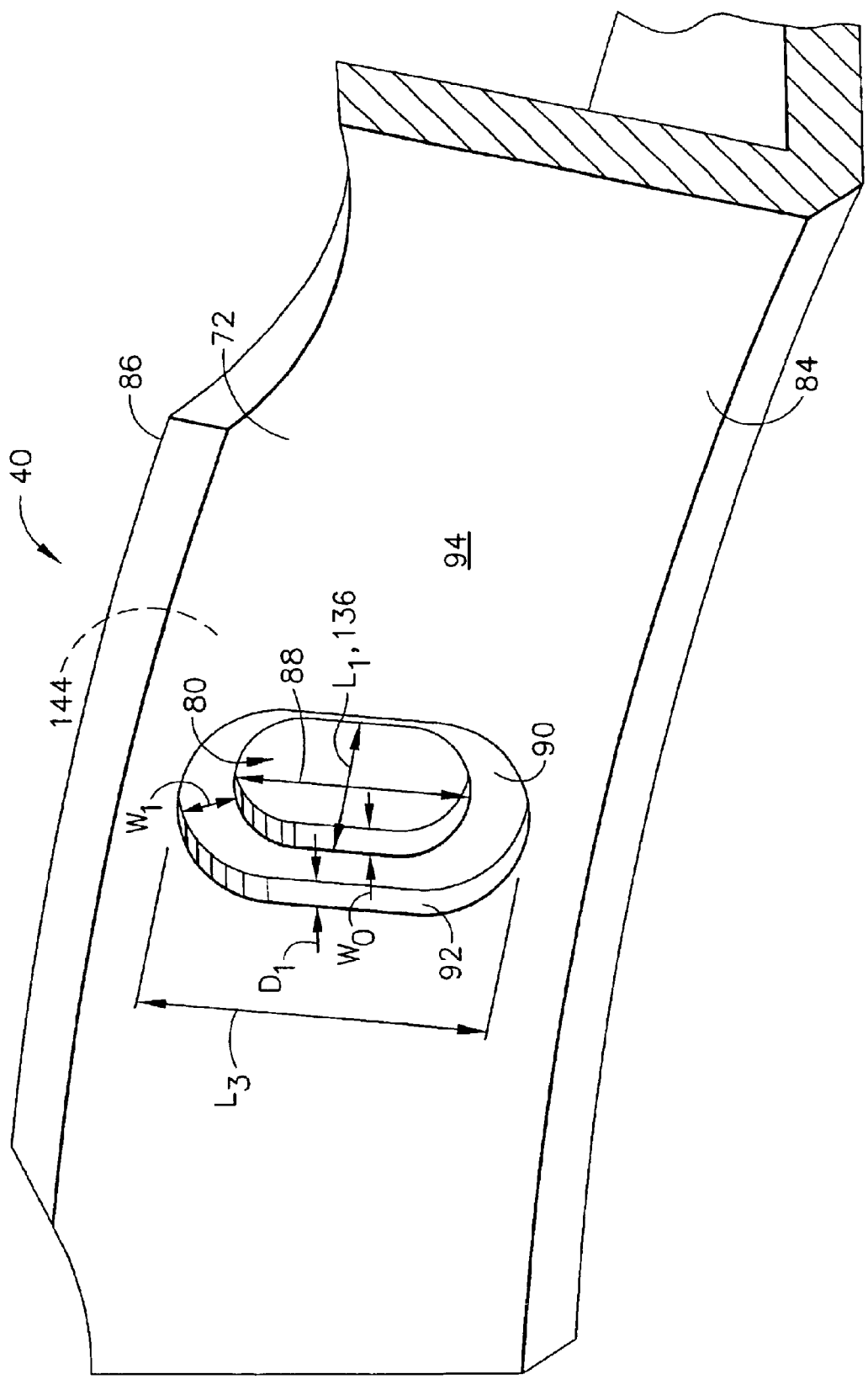
FIG. 3 is a perspective view of a portion of a fan disk shown in FIG. 2.
Figure 4:
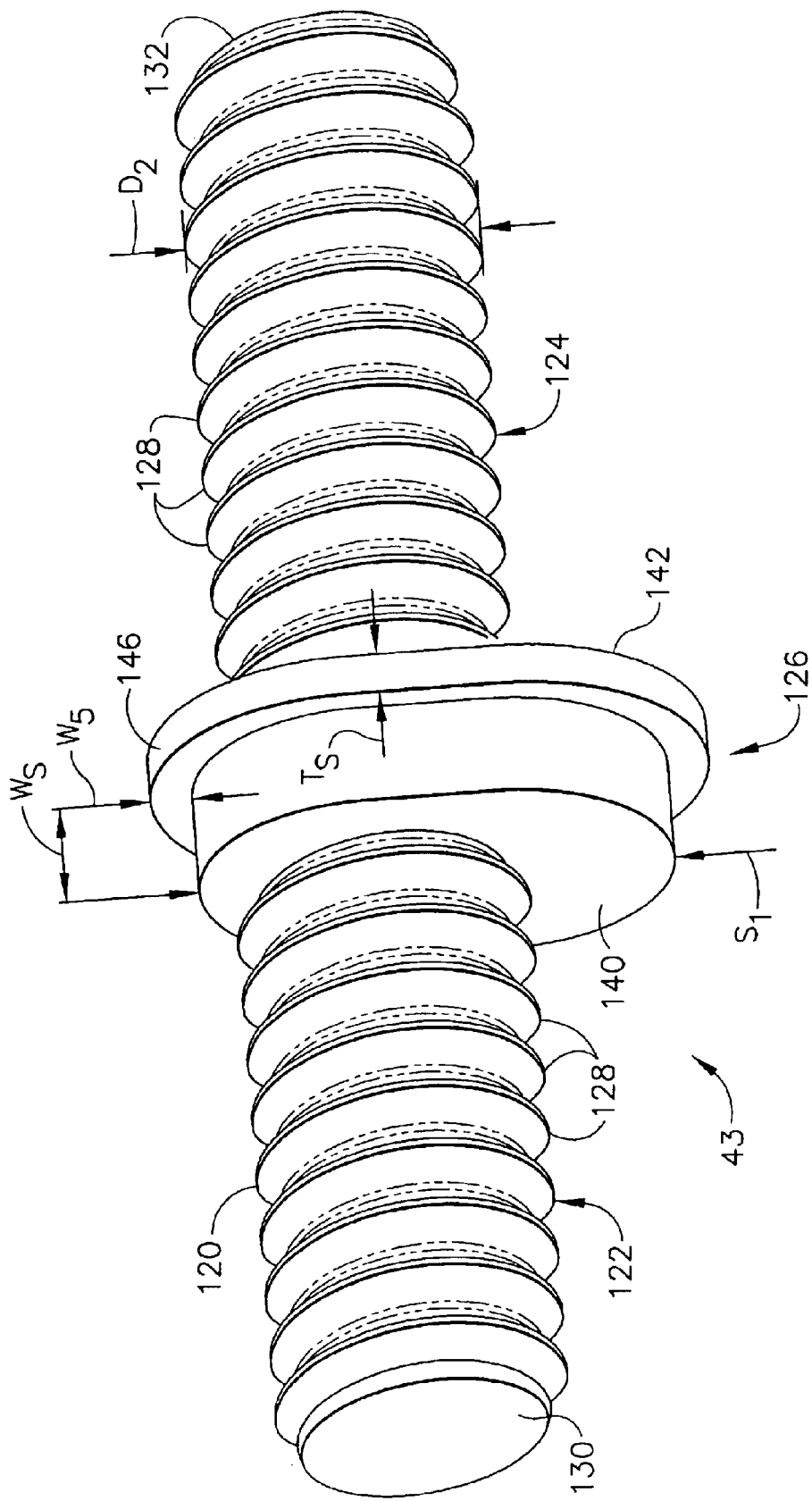
FIG. 4 is a perspective view of a fastener shown in FIG. 2.

FIG. 2 is a cross-sectional illustration of a portion of fan assembly 12 including a fan disk 40. FIG. 3 is a perspective view of a portion of fan disk 40. FIG. 4 is a perspective view of a fastener 120 used with fan assembly 12. Fan disk 40 is coupled to shaft 24 by an aft extension 42, and includes a row 44 of circumferentially-spaced apart fan blades 46 that extend radially outwardly from fan disk 40. More specifically, fan disk 40 is a multi-bore disk that includes a radially outer rim 47 attached to a plurality of disk hubs 48 by a corresponding number of webs 50 that circumscribe a centerline 54 of engine 10. In the exemplary embodiment, two hubs 48 are illustrated.

An annular forward extension 70 including an annular forward flange 72 extends upstream from a forward most web 50. In one embodiment, flange 72 is coupled to web 50. Alternatively, flange 72 is formed integrally with web 50. Flange 72 includes a plurality of circumferentially-spaced openings 80 extending therethrough. More specifically, in the exemplary embodiment, flange 72 includes fourteen circumferentially-spaced openings 80.

Each opening 80 extends from an upstream side 84 of flange 72 to a downstream side 86 of flange 72. Openings 80 are substantially elliptically-shaped such that a major elliptical axis 88 is aligned substantially radially with respect to fan disk 40. More specifically, openings 80 are counter-bored such that a counter-bored ledge 90 circumscribes each respective opening 80 along flange upstream side 84. Ledge 90 has a width $W_1$ measured between opening 80 and an counter-bored sidewall 92, and is recessed a distance $D_1$ with respect to an outer surface 94 of flange upstream side 84.

A spinner 100 is coupled to disk 40 by forward flange 72. Specifically, spinner 100 includes a forward conical section 102 and an aft conical section 104 that extends aftward from forward conical section 102. Spinner 100 facilitates smoothing airflow channeled towards fan assembly 12. Aft conical section 104 includes an aft flange assembly 106 that includes a plurality of circumferentially-spaced openings 108 that enable spinner 100 to be coupled to fan disk 40. Flange assembly 106 and forward flange 72 facilitate accommodating radial growth differential between disk 40 and spinner 100.

A plurality of fasteners or spinner bolts 120 are used to couple spinner 100 to disk 40 through forward flange 72. Each fastener 120 includes a first body portion or shank 122 and a second body portion or shank 124 separated by an anti-rotation stop 126 that has a width $W_s$. In the exemplary embodiment, stop 126 is formed integrally with shanks 122 and 124. Also in the exemplary embodiment, shanks 122 and 124 are identical and each includes a plurality of threads 128 extending from stop 126 to a respective end 130 and 132 of each shank 122 and 124. Alternatively, shanks 122 and 124 are non-identical.

Each shank 122 and 124 has a substantially circular cross-sectional profile. More specifically, each shank 122 and 124 has a diameter $D_2$ that is smaller than a length $L_1$ of a minor axis 136 defining each forward flange opening 80. In contrast, fastener stop 126 has a non-circular cross-sectional profile that is substantially identically sized to the cross-sectional profile defined by opening 80. For example, in the exemplary embodiment, fastener stop 126 is substantially elliptically-shaped and has a major axis length $S_1$ that is slightly smaller than a corresponding length $L_3$ of opening axis 88, and has a minor axis length (not shown) that is slightly smaller than minor axis length $L_1$.

Stop width $W_S$ is measured between opposing downstream side 140 and shoulder 146, and is approximately equal to a width of $W_O$ of each opening 80 measured between ledge 90 and a downstream outer surface 144 of flange 72. Fastener stop 126 also includes an annular shoulder 146 that extends radially outwardly and circumscribes stop 126. More specifically, shoulder 146 has a width $W_5$ that is slightly smaller than ledge width $W_1$, and a thickness $T_s$ that is approximately equal to ledge recessed distance $D_1$. Shoulder 146 also has a cross-sectional profile that is sized substantially identically to a cross sectional profile defined by counter-bored ledge 90.

During assembly of fan assembly 12, initially openings 80 are formed by drilling fan disk forward flange 72. In another embodiment, if an existing fan assembly is being retrofitted or repaired, existing fastener openings are reshaped to form openings 80. Each fastener 120 is then positioned within a respective disk flange opening 80 such that shank 122 and stop 126 are inserted at least partially through opening 80. More specifically, when fastener 120 is fully inserted, stop 126 remains positioned within opening 80 and stop shoulder 146 is positioned against ledge 90 and within recess $D_1$. Accordingly, stop shoulder 146 and ledge 90 not only facilitate positioning fastener 120 with respect to flange 72, but shoulder 146 and ledge 90 also facilitate aligning fastener 120 with resect to flange 72. More specifically, shoulder 146 prevents fastener 120 from being improperly axially inserted through opening 80, and also facilitates proper radial positioning of fastener 120 with respect to flange 72. For example, if fastener 120 is rotated 180° within opening 80, shanks 122 and 124 will be radially offset such that spinner 100 can not be mated against flange 72.

After fastener 120 is positioned within opening 80, a nut 150 is threadably coupled to shank 122 and is tightened against flange outer surface 144 such that fastener 120 is securely coupled to flange 72. More specifically, when fully coupled in position, fastener downstream side 140 is substantially flush with flange outer surface 144, and fastener upstream side 142 is substantially flush with flange outer surface 94.

Spinner 100 is then coupled to fan disk 40 using fasteners 120. Specifically, spinner aft conical section 104 is then positioned adjacent flange 72 such that each respective fastener shank 124 is inserted through each respective spinner opening 108. A nut 152 is then threadably coupled to shank 124 and is tightened to secure spinner 100 to fan disk 40. Because shanks 122 and 124 are identical, in the exemplary embodiment, nuts 150 and 152 are identical and are interchangeable, such that assembly times may be reduced. Once fan assembly 12 is assembled, loading induced between spinner 100 and fan disk 40 is carried by fastener shanks 122 and 124.

During assembly, fastener stop shoulder 146 prevents rotation of fastener 120 within each respective flange opening 80. Furthermore, because shoulder 146 prevents rotation of fasteners 120 within openings 80, riveting operations are no longer necessary to couple spinner 100 to fan disk 40. Accordingly, only one third, or fourteen, openings 80 must be drilled within disk flange 72.

The above-described fastener provides a cost-effective and reliable method for coupling a spinner to a fan disk. More specifically, the fasteners include a pair of opposing threaded shanks that are separated by an anti-rotation stop. When a fastener is secured within a counter-bored opening formed in the fan disk forward flange, the fastener shoulder prevents the fastener from rotating within the opening both during assembly, and after the spinner is coupled to the fan disk. Furthermore, the fastener stop also facilitates aligning each fastener with respect to the fan disk. As a result, the fastener facilitates reducing assembly costs of the fan assembly in a cost-effective and reliable manner.

Exemplary embodiments of fan assemblies are described above in detail. The fan assemblies are not limited to the specific embodiments described herein, but rather, components of each assembly may be utilized independently and separately from other components described herein. For example, each fastener component can also be used in combination with other fan assembly and engine components, and in combination with the other fan assembly components described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   forming at least one substantially elliptically-shaped opening within a flange extending from a fan disk;
   inserting a fastener at least partially through the at least one flange opening, wherein the fastener includes a first body portion, a second body portion; and
   coupling the fastener to the flange such that a fastener stop is positioned within the at least one flange opening.

2. A method in accordance with claim 1 wherein coupling the fastener to the flange further comprises coupling the fastener to the flange such that the fastener stop prevents the fastener from rotating within the opening after the fastener is coupled in position.

3. A method in accordance with claim 1 further comprising coupling a spinner to the fan disk using the fastener.

4. A method in accordance with claim 1 wherein coupling the fastener to the flange further comprises positioning the fastener with respect to the flange using the fastener stop.

5. A method in accordance with claim 1 wherein inserting a fastener at least partially through the at least one flange opening further comprises inserting a fastener including a stop that has a cross-sectional area that is sized approximately identically to a cross-sectional area defined within the at least one flange opening.

6. A fan assembly for a gas turbine engine, said fan assembly comprising:

a fan disk comprising a plurality of hubs coupled to a disk rim by a plurality of webs; and an annular forward extension comprising a flange, said forward extension extending forwardly from an upstream most of said webs, said flange comprising a plurality of circumferentially spaced openings extending therethrough, at least one of said openings being substantially elliptically-shaped.

7. A fan assembly in accordance with claim 6 wherein said at least one substantially elliptically-shaped opening is counter-bored within said flange.

8. A fan assembly in accordance with claim 6 further comprising a fastener comprising a first body portion, a second body portion, and an anti-rotation stop extending therebetween, said fastener coupled to said flange by a coupling.

9. A fan assembly in accordance with claim 8 wherein said stop has a cross-sectional area that is sized approximately identically to a cross-sectional area of said opening.

10. A fan assembly in accordance with claim 8 wherein said opening is circumscribed by a counter-bored ledge, said fastener stop comprising a shoulder extending radially outwardly from said stop, said ledge sized to receive said shoulder therein when said fastener coupled to said flange.

11. A fan assembly in accordance with claim 8 wherein at least one of said fastener first body portion and said second body portion is threaded.

12. A fan assembly in accordance with claim 8 wherein said stop facilitates preventing said fastener from rotating within said opening when said fastener is coupled to said flange.

13. A fan assembly in accordance with claim 8 wherein said stop facilitates aligning said fastener with respect to said flange.

14. A fan assembly comprising:

a fan disk comprising an annular flange comprising at least one opening extending therethrough;

at least one fastener comprising a first body portion, a second body portion, and an anti-rotation stop extending therebetween; and a spinner coupled to said fan disk by said at least one fastener, said fastener stop facilitates aligning said at least one fastener with respect to said flange.

15. A fan assembly in accordance with claim 14 wherein said fan disk comprises an annular flange comprising at least one opening extending therethrough, said opening sized to receive at least a portion of said fastener therethrough, said fastener stop having a cross-sectional area that is sized substantially identically to said at least one flange opening.

16. A fan assembly in accordance with claim 14 wherein said fan disk comprises an annular flange comprising at least one substantially elliptically-shaped opening extending therethrough, said opening sized to receive at least a portion of said fastener therethrough, said fastener stop having a substantially elliptical cross-sectional area that is sized substantially identically to said at least one flange opening.

17. A fan assembly in accordance with claim 14 wherein said fan disk comprises an annular flange comprising at least one counter-bored opening extending therethrough, said opening sized to receive at least a portion of said fastener therethrough.

18. A fan assembly in accordance with claim 14 wherein at least one of said fastener first and second body portions is threaded, said spinner threadingly coupled to said fan disk.

19. A fan assembly in accordance with claim 14 wherein said fan disk comprises an annular flange comprising at least one opening extending therethrough, said opening sized to receive at least a portion of said fastener therethrough, said fastener stop facilitates preventing said fastener from rotating within said opening when said spinner is coupled to said fan disk.

\* \* \* \* \*